(12) United States Patent  (10) Patent No.: US 9,370,840 B1
Rozot  (45) Date of Patent: Jun. 21, 2016

(54) SCRAP METAL CUTTING MOBILE UNIT

(71) Applicant: Edw. C. Levy Co., Detroit, MI (US)

(72) Inventor: Thierry Rozot, Valparaiso, IN (US)

(73) Assignee: Edw. C. Levy Co., Detroit, MI (US)

( * ) Notice: Subject to any disclaimer, the term of this patent is extended or adjusted under 35 U.S.C. 154(b) by 0 days.

(21) Appl. No.: 14/608,692

(22) Filed: Jan. 29, 2015

(51) Int. Cl.
*G05D 1/00* (2006.01)
*B23K 7/10* (2006.01)
*G07C 5/08* (2006.01)
*B23K 7/00* (2006.01)

(52) U.S. Cl.
CPC ............... *B23K 7/102* (2013.01); *B23K 7/002* (2013.01); *G07C 5/0808* (2013.01); *G07C 5/0816* (2013.01); *G07C 5/0841* (2013.01)

(58) Field of Classification Search
CPC ...... B23K 7/102; B23K 7/002; G07C 5/0808; G07C 5/0816
See application file for complete search history.

(56) References Cited

U.S. PATENT DOCUMENTS

| | | | | |
|---|---|---|---|---|
| 4,019,357 A | * | 4/1977 | Gokyu | B21D 43/287 106/644 |
| 4,560,112 A | * | 12/1985 | Rouse | B02C 18/142 241/166 |
| 5,388,774 A | * | 2/1995 | Zizzo | B02C 13/16 241/152.2 |
| 7,045,742 B2 | | 5/2006 | Feichtinger et al. | |
| 7,600,460 B2 | | 10/2009 | Manders | |
| 7,967,870 B2 | * | 6/2011 | Ko | B25J 18/025 180/167 |
| 8,677,876 B2 | * | 3/2014 | Diaz | F41H 7/005 102/402 |
| 9,256,849 B2 | * | 2/2016 | Nielsen | G06Q 10/06 |
| 2005/0132857 A1 | * | 6/2005 | Peters | B23D 21/00 83/300 |
| 2009/0223355 A1 | * | 9/2009 | Manders | F41B 9/0031 89/1.13 |
| 2009/0242037 A1 | | 10/2009 | Drescher | |
| 2012/0266803 A1 | | 10/2012 | Zediker et al. | |

FOREIGN PATENT DOCUMENTS

| | | |
|---|---|---|
| CN | 200951481 Y | 9/2007 |
| CN | 201500842 U | 6/2010 |
| CN | 201799740 U | 4/2011 |
| CN | 201912666 U | 8/2011 |
| CN | 202701579 U | 1/2013 |
| CN | 202861587 U | 4/2013 |
| CN | 203210460 U | 9/2013 |
| JP | 2001214620 A | 8/2001 |

\* cited by examiner

*Primary Examiner* — Ian Jen
(74) *Attorney, Agent, or Firm* — Honigman Miller Schwartz and Cohn LLP (57) ABSTRACT

A mobile cutting system includes a vehicle including a vehicle body and a drive system, a cutter attached to the vehicle body, and a controller in communication with the drive system, the cutter and the base station. The base station includes a post extending perpendicular to a surface, one or more fluid sources each storing a corresponding fluid used by the cutter to cut, and a reel attached proximate to a distal end of the post. The system further includes one or more feed lines each providing fluid communication between the cutter and corresponding ones of the fluid sources. Each feed line is received by the reel and suspended above the surface between the reel and the vehicle. The reel is configured to enable the feed lines to release as the vehicle maneuvers away from the base station or retract as the vehicle maneuvers toward the base station.

24 Claims, 9 Drawing Sheets

SCRAP METAL CUTTING MOBILE UNIT

TECHNICAL FIELD

This disclosure relates to a scrap metal cutting mobile unit.

BACKGROUND

A steel mill or steelworks is an industrial plant that manufactures steel. Steel may be produced from iron ore or from scrap steel. Integrated steel mills use raw materials such as iron ore, limestone, and coal (or coke) to produce steel. The integrated steel mills add the raw materials in batches into a blast furnace that liquefies the ore. The liquid iron is then blasted into pig iron or is further processed. Mini-mills are generally a secondary steel producer that use scrap steel to produce the steel. Scrap steel is steel recycled from used vehicles and equipment or byproducts of manufacturing. In some examples, recycled steel is often less pure than the steel originally used to manufacture the recycled product. A mini-mill, typically, has an electric arc furnace that melts the scrap metal, a ladle or vacuum furnace for precision control of chemistry, a strip or billet continuous caster that converts the molten steel to solid form, a reheat furnace, and a rolling mill. Each mini-mill converts the scrap steel into a different form, size, type and chemistry.

Cutting tools, such an oxy-cutting torch or oxygen lance, cut objects in scrap yards to obtain usable steel for recycling. The cutting tools often require a supply of fuel and a reactant gas to perform cutting operations. Sources for the fuel and reactant gas are often stored in large tanks that remain stationary due to their size and weight. The objects to be cut are often large and must be positioned within a proximity of the cutting tools and the fuel and reactant gas sources. Mobile vehicles equipped with cutting tools require feed lines to transfer the fuel and reactant gas from the sources. The feed lines may become tangled and kinked as the mobile vehicle maneuvers, and additionally, may be damaged when being pulled across a ground surface or when caught on other objects within the environment of the mobile vehicle. Damaged feed lines require replacement and also pose a risk of leaking the combustible fuel and reactant gas to the environment, which may lead to fatal explosions.

SUMMARY

One aspect of the disclosure provides a vehicle including a vehicle body and a drive system, a cutter attached to the vehicle body, and a controller in communication with the drive system, the cutter and the base station. The drive system supports the vehicle body and configured to maneuver the vehicle about a surface. The cutter is configured to cut an object including scrap metal. The base station includes a post extending perpendicular from the surface, one or more fluid sources each storing a corresponding fluid used by the cutter to cut the object, and a reel attached proximate to a distal end of the post. The system also includes one or more feed lines each providing fluid communication between the cutter and corresponding ones of the fluid sources. Each feed line is received by the reel and suspended above the surface between the reel and the vehicle. The reel is configured to enable the feed lines to release as the vehicle maneuvers away from the base station or retract as the vehicle maneuvers toward the base station. The controller includes a data processing device that executes a command to control one or more of the drive system, the cutter and the base station.

Implementations of the disclosure may include one or more of the following optional features. In some implementations, the system includes a manipulator arm having first and second portions. The first portion is coupled to the vehicle body and the second portion is coupled to the cutter. In some examples, the cutter is releasably coupled to the second portion of the manipulator arm. The cutter may include a torch source and a pilot light in communication with the controller and the torch source. The pilot light may ignite the torch source in response to the command from the cutter.

In some examples, the system further includes an operator interface in communication with the controller. The operator interface may receive an operator input from an operator of the vehicle. The some scenarios, the controller receives the operator input and based on the received operator input, the controller executes the command. In some implementations, the base station includes a sensor system in communication with the controller. In some examples, the sensor system provides a base station parameter signal to the controller obtained by one or more sensors disposed at the base station and the controller executes the command based on the received base station parameter signal. the sensor system may include at least one of a reactant pressure sensor, a reactant level sensor, a reactant status sensor, a fuel pressure sensor, a fuel level sensor, a fuel status sensor, a feed line tension sensor, or a vehicle position sensor. The operator interface may include a display and the operator interface may receive a graphics command from the controller based on the received base station parameter signal. The graphics command may cause the operator interface to display a message upon the display corresponding to the base station parameter signal. In some scenarios, the message indicates an emergency condition when a pressure obtained by the reactant pressure sensor or the fuel pressure sensor is greater than an upper pressure limit, or a tension of the one or more feed lines obtained by the feed line tension sensor is greater than an upper tension limit. In other scenarios, the message indicates a non-emergency condition when the pressure obtained by the reactant pressure sensor or the fuel pressure sensor is less than lower pressure limit, or the tension of the one or more feed lines obtained by the feed line tension sensor is greater than a lower tension limit. In some implementations, the controller issues a shutdown command to the drive system when the controller detects an emergency condition based on the received base station parameter signal. The shutdown command may cause the drive system to turn off the vehicle ignition.

In some implementations, the base station further includes a biasing member disposed on the reel. The biasing member may bias the reel in a retraction direction to retract the one or more feed lines. Additionally or alternatively, the base station may include a retraction motor in communication with the controller. The retraction motor may rotate the reel in a retraction direction to retract the feed line in response to the command from the controller. The one or more feed lines may include a first feed line transferring a fuel from the corresponding fluid source at the base station to the cutter, and a second feed line transferring a reactant from the corresponding fluid source at the base station to the cutter. In some examples, the system further includes a guide cable guiding the first feed line and the second feed line from the base station to the cutter. In these examples, the guide cable includes connection cables configured to maintain a position of the first and second feed lines. The vehicle may also include a container in communication with the controller and a powder injector in communication with the controller and the container. The container may store granulated steel powder and the powder injector may inject the steel powder from the container onto a cutting area of the object in response to the command from the controller.

Another aspect of the disclosure provides a method including receiving, at a controller of a system, base station parameter signals from a sensor system located at a base station of the system. The method further includes determining, by the controller, whether or not an emergency condition is present in the system based on the received one or more base parameter signals, and executing, by the controller, an emergency shutdown procedure for the system when the emergency condition is present. The system includes a vehicle including a vehicle body and a drive system. The drive system supports the vehicle body and is configured to maneuver the vehicle about a surface. The system further includes a cutter attached to the vehicle body and configured to cut an object. The system also includes a base station that includes a post extending perpendicular from the surface and first and second fluid sources each storing a corresponding fluid used by the cutter to cut the object, a reel attached proximate to a distal end of the post, and first and second feed lines each providing fluid communication between the cutter and corresponding ones of the fluid sources. Each feed line is received by the reel and suspended above the surface between the reel and the vehicle. The reel is configured to enable the feed lines to release as the vehicle maneuvers away from the base station or retract as the vehicle maneuvers toward the base station.

Implementations of this aspect of the disclosure may include one or more of the following optional features. In some examples, determining whether or not the emergency condition is present includes comparing a fuel pressure from the first fluid source and a reactant pressure from the second fluid source to an upper pressure limit, and detecting the presence of the emergency condition when the fuel pressure or the reactant pressure is greater than the upper pressure limit. In these examples, the fuel pressure and the reactant pressure are obtained by corresponding sensors of the sensor system. When the fuel pressure or the reactant pressure is not greater than the upper pressure limit, the controller may compare the fuel pressure and the reactant pressure to a lower pressure limit, and detect the presence of a non-emergency condition in the system when the fuel pressure or the reactant pressure is less than the lower pressure limit. The controller may issue a graphics command to an operator interface of the system that causes the operator interface to display a warning message corresponding to the presence of the non-emergency condition.

In some scenarios, determining whether or not an emergency condition is present includes comparing a tension of the feed lines to an upper tension limit detecting the presence of the emergency condition when the feed line tension is greater than the upper tension limit. In these scenarios, the feed line tension is obtained by a feed line tension sensor of the sensor system. Prior to comparing the feed line tension to the upper tension limit, the controller may compare the feed line tension to a lower tension limit and detect the presence of a non-emergency condition in the system when the feed line tension is greater than the lower tension limit. The controller may issue a graphics command to an operator interface of the system that causes the operator interface to display a warning message corresponding to the presence of the non-emergency condition.

In some implementations, the controller executes the emergency shutdown procedure for the system by a base station command to deactivate fuel and reactant solenoids of the sensor system, issuing a drive system command to command the drive system to turn off ignition to the vehicle, and issuing a graphics command to an operator interface of the system. In these implementations, deactivating the fuel and reactant solenoids blocks the fluid communication between the cutter and corresponding ones of the fluid sources and the graphics command causes the operator interface to display a warning message corresponding to the presence of the emergency condition. Optionally, the method also includes comparing, by the controller, a tension of the feed lines to slack limit, and when the feed line tension is less than the slack limit, issuing a base station command to cause a retraction motor to rotate the reel in a retraction direction to retract the feed lines. The feed line tension may be obtained by a feed line tension sensor of the sensor system.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Most steel mills use scrap metal. Some integrated steel mills use a combination of scrap steel and iron ore to produce steel. Mini-mills use 100% scrap steel for producing steel. Integrated steel mills and mini-mills purchase scrap steel to produce steel. The steel purchased may be of any form, size, type, and chemistry. In some examples, the steel mill may also recycle its own scrap metal. Sometimes, the scrap pieces are too big and need to be divided into smaller portions. It is desired to have a cutting tool (e.g., oxy-cutting torch or oxygen lance) that cuts the large scrap pieces into smaller pieces while maintaining safety of the operator by keeping the operator at a safe distance from the cutting tool.

Figure 1A:
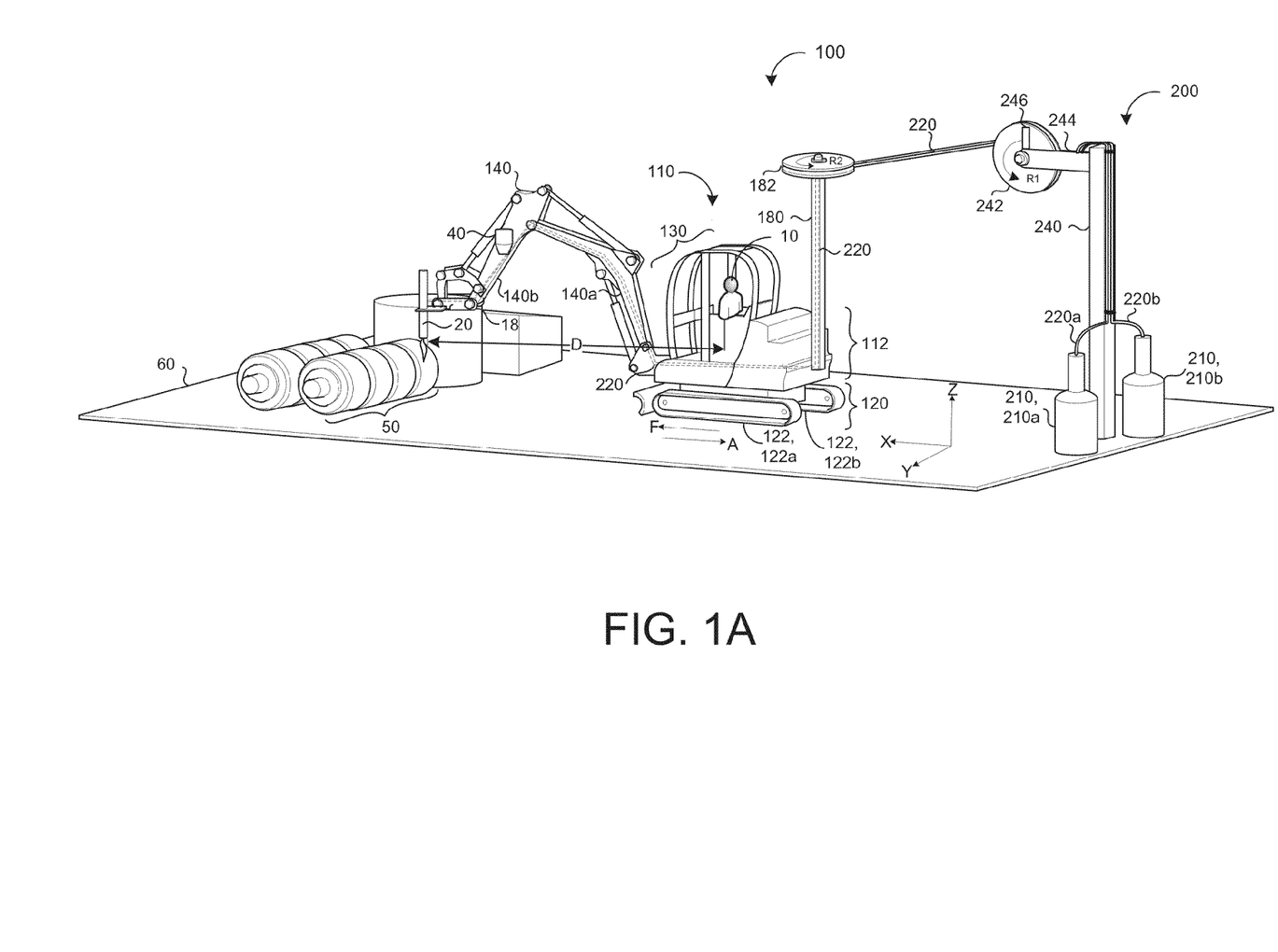
FIGS. 1A and 1B are schematic views of an example mobile cutting system.
Figure 1B:
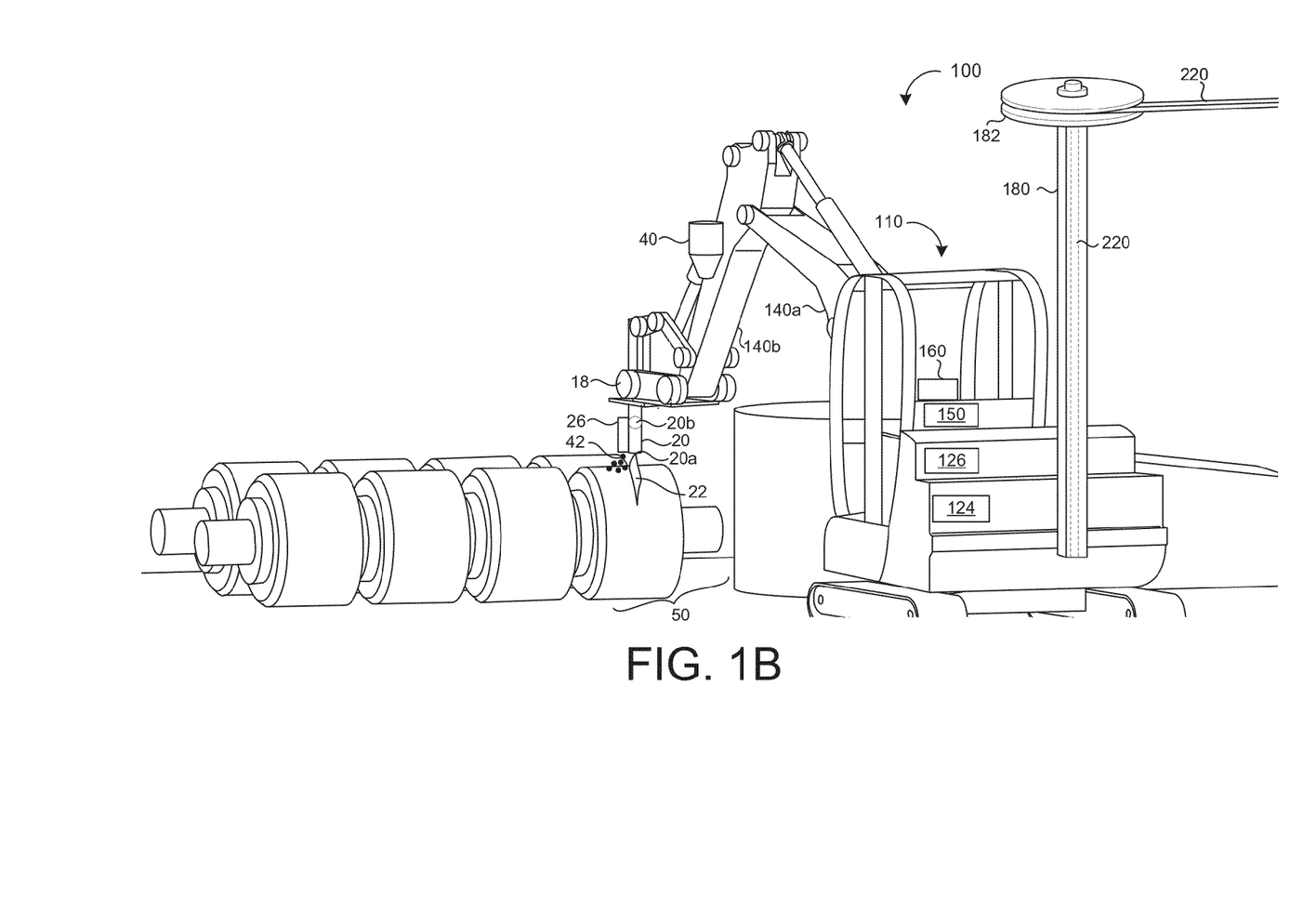

Referring to FIGS. 1A-1B, in some implementations, a mobile cutting system 100 ("system 100") for cutting large objects (e.g., scrap steel) gives an operator 10 the ability to control a cutter 20 (e.g., a torch cutter or a lance cutter) from a distance to cut the object 50 (e.g., scrap steel). The system 100 allows an operator 10 to be at a safe distance, D, from the cutter 20 providing a safer working environment for the operator 10 by positioning the operator away from flames 22, combustible gases, sparks, liquid steel, or other harmful byproducts of cutting operations. The system 100 includes a vehicle 110, a cutter 20, a controller 150, and a base station 200.

The vehicle 110 includes a drive system 120 supporting a vehicle body 112 that defines a forward drive direction F. The drive system 120 includes driven wheels 122, e.g., left and right track links 122a, 122b or left and right, back and front drive wheels (not shown) for traversing across an operating surface 60. The driven wheels 122a, 122b (e.g. tracks) are substantially opposed along a fore-aft axis X defined by the vehicle body 112. In some examples, the drive system 120 includes a wheel encoder 128 that converts the rotational motion of the wheels 122 to an analog or digital signal. The drive system 120 includes a drive motor 124 that drives the wheels 122 and also includes an ignition switch for turning on and shutting down the vehicle 110. The vehicle 110 can move across the operating surface 60 through various combinations of movements relative to three mutually perpendicular axis defined by the vehicle body 112 that include the fore-aft axis X; a transverse axis Y; and a central vertical axis Z. A forward drive direction along the fore-aft axis X is designated F (hereinafter "forward"), and an aft drive direction along the fore-aft axis Y is designated A (hereinafter "rearward"). In some examples, the vehicle body 112 supports a power source 126 (e.g., a battery) for powering electrical components (e.g., the controller 140, operator interface 160) of the vehicle 110.

The vehicle body 112 may include a cab 130 supported by the vehicle body 112. The cab 130 includes a seat to fit at least one operator 10. The cab 130 may include an air conditioner and a heater to improve the working condition of the operator 10 during warm or cold weather. The cab 130 includes a front window 132 (FIG. 2) that allows the operator 10 to view the front of the vehicle 110. The front window 132 may be protected by a mesh screen 132a (FIG. 2) capable of being replaced. The mesh screen 132a protects the operator 10 from sparks or debris during cutting operations while increasing life of the front window 132 due to spark stick and providing a light barrier while cutting.

The vehicle 110 also includes an articulated arm 140 having a first portion 140a and a second portion 140b. The vehicle body 112 is attached to the proximal end of the first portion 140a and a cutter 20 is attached to the distal end of the second portion 140b. The cutter 20 may be releasably attached to the second portion 140b of the articulated arm 140. A cutter attachment 18 may enable the cutter 20 to releasably attach to the second portion 140b. In some examples, the cutter 20 may be removed and replaced with other attachments, such as a hydraulic grip or a hydraulic breaker.

The cutter 20 requires a supply of fuel and/or a reactant to operate. One or more stationary fluid sources 210 (e.g., tanks) located at the base station 200 may store and supply the corresponding fuel and/or reactant to the cutter 20 during a cutting operation. Accordingly, one or more corresponding feed lines 220 fluidly couple the one or more fluid sources 210 to the cutter 20. The cutter 20 may include a torch cutter or a lance depending upon the cutting operations being performed in the environment (e.g., scrap yard). In some implementations, a first feed line 220a transfers a fuel from a first fluid source 210a (e.g., an Acetylene source) to the cutter 20. The first feed line 220a may also be referred to as a fuel feed line 220a. Additionally or alternatively, a second feed line 220b transfers reactant from a second fluid source 210b (e.g., an Oxygen source) to the cutter 20. The second feed line 220b may also be referred to as a reactant line 220b. Torch cutting, also referred to as oxy-fuel cutting, is a process that uses fuel gases and oxygen to cut a metal (e.g., steel) by heating the metal to its kindling temperature. As used herein, kindling temperature refers to a lowest temperature of a substance at which spontaneous ignition occurs without an external source of ignition, such as a flame or spark. A stream of oxygen is then continuously applied to burn the metal into a metal oxide that flows out of the kerf as slag. Pure oxygen is used instead of air to increase flame temperature and allow for localized cutting of an object 50 (e.g., carbon steel). Accordingly, torch cutters require fuel and oxygen. In some examples, the cutting torch is a large capacity oxy cutting torch (e.g. tuyere greater than 0.60 millimeter) used in conjunction with steel powder injection to increase cutting efficiency and reduce kerf lost. In the example shown, a container 40 that stores steel powder 42 is attached to, or attached proximate to, the manipulator arm 140. The container 40 may be refilled using granulated steel powder 42. A powder injector 26 may inject steel powder 42 from the container 40 onto a cutting area of the object 50 to initiate a redox reaction to increase cutting efficiency. For instance, the redox reaction occurs when the carbon steel is heated to at least 2,300° C. The injector 26 may continuously inject the steel powder 42 during cutting or on demand by the operator 10 via an operator input (e.g., command) to an operator interface (OI) 160. In some examples, a torch source 20a in communication with a pilot light 20b ignites the flame 22 in response to a command to the OI 160 by the operator 10. The object 50 may include a high alloy steel, stainless steel, tundish, ladle, etc.

The system 100 allows the operator 10 to input commands to the system 100 via the OI 160 to maneuver the articulated arm 140 holding the cutter 20 to cut the object 50, while maintaining the safe distance D between the operator 10 and the cutter 20. In some examples, the manipulator arm 140 is wrapped in a fire resistant/retardant material to protect the one or more feed lines 220 routed along the manipulator arm 140 to the cutter 20 from direct contact with sparks, debris and liquid metal during cutting operations.

The operator 10 may input commands to the controller 150 via the OI 160 to command the drive system 120 to maneuver the vehicle 110 about the operation surface 60. In some implementations, the base station 200 includes a post 240 extending along the central vertical Z-axis from the operation surface 60. Additionally, a post 180 may extend along the central vertical Z-axis from a backend of the vehicle 110; however, the post 180 may extend from any portion of the vehicle 110 or the vehicle 110 may include no post at all. The posts 180, 240 support and suspend the one or more feed lines 220 above the operating surface 60 between the base station 200 and the vehicle 110. A reel 242 extending from the post 240 receives the one or more feed lines 220 and provides tethering of the one or more feed lines 220 as the vehicle 110 maneuvers with respect to the position of the base station 200. In the example shown, a reel arm 244 extends along the fore-aft X-axis from the distal end of the post 240 and mounts the reel 242 via an axle to permit rotation of the reel 242 about a first axis of rotation R1. In the example shown, the direction of the arrow indicates a release direction for releasing the feed line(s) 220 as the vehicle 110 maneuvers away from the reel 242, causing the feed line(s) 220 to pull away from the reel 242. In some examples, the reel 242 includes a biasing member 246 to bias rotation of the reel 242 about the first axis of rotation R1 in a retraction direction that is opposite the arrow, enabling the feed line(s) 220 to retract when not being pulled. In some implementations, the reel arm 244 swivels about the post 240. The one or more feed lines 220 may be spooled around the reel 242, preventing kinks in the feed lines 220. Additionally, a guide wheel 182 may mount to the vehicle post 180 to receive and route the feed lines 220 to the vehicle 110 and the cutter 20. The guide wheel 182 may rotate about a second axis of rotation R2 defined by the vehicle post 180.

As used herein, the term "tethering" refers to the one or more feed lines 220 releasing from the reel 242 when the vehicle 110 maneuvers away from the base station 200 and the one or more feed lines 220 retracting by the reel 242 when the vehicle 110 maneuvers toward the base station 200. A retraction motor 250 (FIGS. 1C-1E) in communication with the controller may retract the one or more feed lines 220 when tension in the one or more feed lines 220 is below a slack limit (e.g., the retraction motor 250 prevents slack in the feed line(s) 220). For instance, the retraction motor 250 may rotate the reel 242 in the retraction direction to retract the feed line(s) 220 in response to a command from the controller 150. The retraction motor 250 may be used with or in lieu of the biasing member 246 to provide retraction of the feed line(s) 220. Accordingly, the tethering provided by the reel 242 in communication with the retraction motor 250 (and/or biasing member 246) maintains constant tension in the one or more feed lines 220 suspended between the posts 180, 240 above the operating surface 60 as the vehicle 110 maneuvers thereabout.

Constant tension in the feed lines 220 provided by the retraction motor 250 and the reel 242 prevents the one or more feed lines 220 from contacting the operating surface 60 as the vehicle 110 maneuvers there about. If the feed lines 220 were to graze along, or be in contact with the operation surface 60, damage to the feed lines 220 may occur from abrasion or catching on objects. A damaged feed line 220 may refer to a feed line being severed or punctured, causing the fluid (e.g., fuel and/or oxygen) contained therein to escape before being fed the cutter 20. Additionally, the risk of fatal explosions caused by the combustible fuel is drastically increased. Accordingly, the constant tension of the one or more feed lines 220 between the post 240 and the vehicle 110 safely permits the vehicle 110 to maneuver freely about the operation surface 60 without causing the one or more feed lines 220 to come into contact with the operation surface 60 and/or become tangled.

Figure 1C:
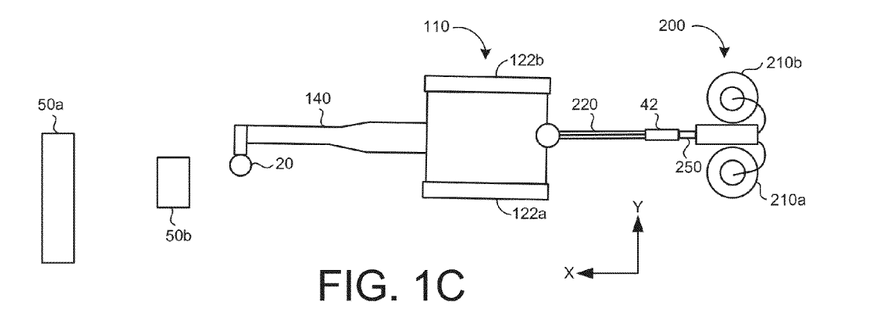
FIGS. 1C-1E are schematic views of an example vehicle of a mobile cutting system maneuvering to cut objects.
Figure 1D:
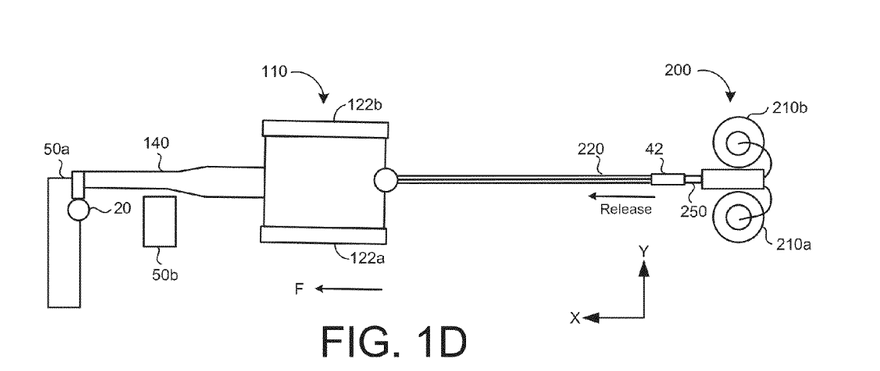
Figure 1E:
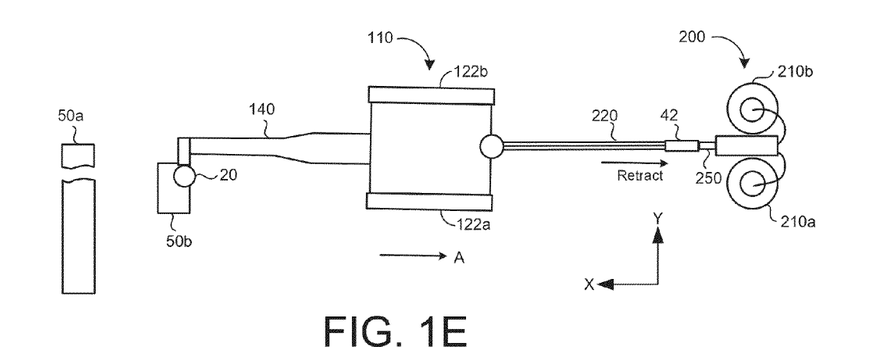

Referring to FIGS. 1C-1E, the system 100 permits the feed line(s) 220 to release and expand, while maintaining constant tension in the feed line(s) 220, as the vehicle 110 maneuvers to cut objects 50a, 50b. FIG. 1C shows the vehicle relatively close to the base station 200 and the one or more feed lines 220 providing fluid communication between the cutter 20 and the sources 210 at the base station 200.

In FIG. 1D, the vehicle 110 maneuvers in the forward direction F to position the cutter 20 to cut the object 50a. As the vehicle 110 maneuvers forward F, the reel 242 proportionally releases the feed lines 220 while maintaining tension in the feed lines 220 between the vehicle 110 and the base station 200.

Referring to FIG. 1E, after the cutter 20 cuts the object 50a, the vehicle 110 maneuvers in the reverse direction A to position the cutter 20 at the object 50b to perform cutting thereon. As the vehicle 110 maneuvers backward A, the reel 242 proportionally retracts the feed lines 220 while maintaining constant tension in the feed lines 220 between the vehicle 110 and the base station 200. In some examples, the biasing member 246 enables the reel 242 to retract the feed lines. In other examples, the retraction motor 250 is used to retract the feed lines 220. In some examples, the biasing member 246 and the retraction motor 250 retract the feed lines 220 while maintaining constant tension therein.

Figure 1F:
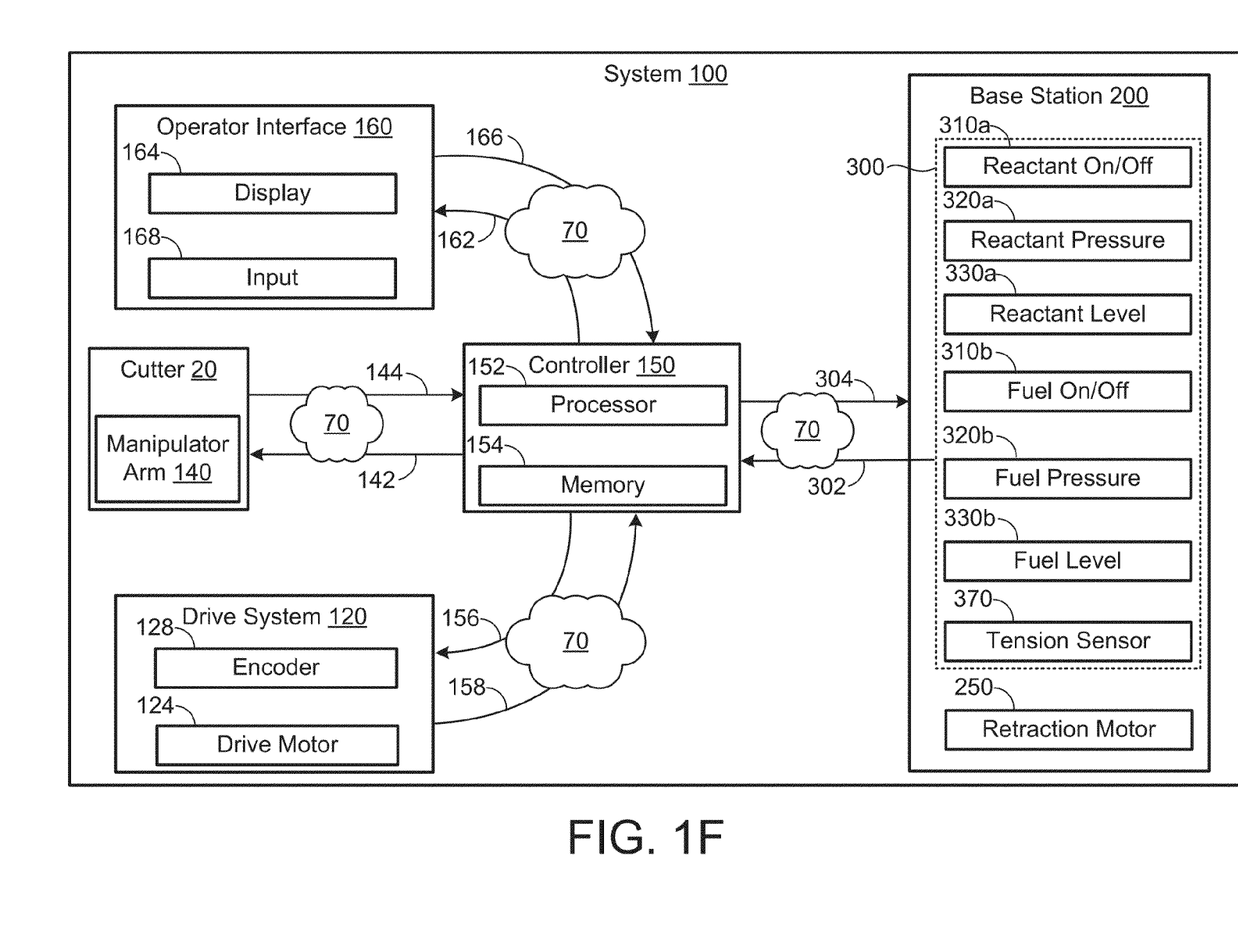
FIG. 1F is a schematic view of example components of an example mobile cutting system.

FIG. 1F provides a schematic diagram of the system 100. The controller 150 is in communication with the OI 160, the drive system 120, the cutter 20, the articulated arm 140 and the base station 200. The controller 150 may communicate via wires and/or wirelessly via a network 70.

The network 70 may include any type of network that allows sending and receiving communication signals, such as a wireless telecommunication network, a cellular telephone network, a time division multiple access (TDMA) network, a code division multiple access (CDMA) network, Global system for mobile communications (GSM), a third generation (3G) network, fourth generation (4G) network, a satellite communications network, and other communication networks. The network 70 may include one or more of a Wide Area Network (WAN), a Local Area Network (LAN), and a Personal Area Network (PAN). In some examples, the network 70 includes a combination of data networks, telecommunication networks, and a combination of data and telecommunication networks. In some examples, the network 70 provides access to cloud computing resources, which may be elastic/on-demand computing and/or storage resources available over the network 70. The term 'cloud' services generally refers to a service performed not locally on the controller 150, but rather delivered from one or more remote devices accessible via one or more networks 70.

The controller 150 may include a data processing device 152 (e.g., processor) and non-transitory memory 154 that stores computer readable instructions that execute on the data processing device 152. When executed, the computer-readable instructions may cause the processing device 152 to issue one or more commands, and/or detect the presence of emergency and non-emergency conditions. The controller 150 may receive base station parameters signals 302 from a sensor system 300, including a sensor suite of one or more sensors 310a-370 monitoring various parameters at the base station 200. A fuel status sensor 310a (e.g., fuel solenoid) indicates whether a fuel source (e.g., first fluid source 210a) is On and supplying fuel (e.g., Acetylene) to the cutter 20 or is OFF. The fuel status sensor 310a may correspond to a fuel solenoid operable between a first position to turn On the fuel source 210a and a second position to turn Off the fuel source 210a. A fuel pressure sensor 320a indicates a pressure or fluid flow of the fuel within the feed line (e.g., first feed line 220a) and a fuel level sensor 330a indicates a fuel level within the fuel source 210a. A reactant status sensor 310b (e.g., reactant solenoid) indicates whether a reactant source (e.g., second fluid source 210b) is On and supplying a reactant (e.g., Oxygen) to the cutter 20 or is Off. The reactant status sensor 310b may correspond to a solenoid operable between a first position to turn On the reactant source 210b and a second position to turn off the reactant source 210b. A reactant pressure sensor 320b indicates a pressure or fluid flow of the reactant within the feed line (e.g., second feed line 220b) and a reactant level sensor 330b indicates a reactant level within the reactant source 210b. A tension sensor 370 indicates a tension of the one or more feed lines 220, 220a-b suspended between the base station 200 (e.g., at the post 240) and the vehicle 110 (e.g., at the pole 180). The controller 150 may receive one or more base station parameter signals 302 and issue one or more commands 304 to the base station 200 based on the received signals 302. For example, the controller 150 may issue base station commands 304 to activate/deactivate the reactant and/or fuel solenoids 310a, 310b to turn ON/OFF the corresponding reactant and/or fuel sources 210a, 210b. In some scenarios, the controller 150 may issue a base station command 304 to activate the retraction motor 250 at the base station 200 to retract, and thereby increase the tension, of the one or more feed lines 220 when the tension sensor 370 indicates the tension of the feed line(s) 220 is less than a slack limit. The controller 150 may issue the commands automatically when emergency conditions are present or the controller 150 may issue the commands in response to an operator input 166 from the OI 160.

The OI 160 includes a display 164 and an input device 168. The display 164 may display an instrument cluster (FIG. 2) related to operation of the vehicle 110, the cutter 20 and/or the base station 200. For example, the controller 150 may issue graphic commands 162 to the OI 160 to display various parameters for the operator 10 to view upon the display 164. In some scenarios, the graphic commands 162 relate to warning messages or notifications when the controller 150 detects the presence of one or more emergency or non-emergency conditions at the base station 200 based on the received base station parameter signals 302. The input device 168 may correspond to a touch screen, keyboard, joystick or mouse configured to receive an input 166 from the operator 10. The input device 168 may include a speech recognition device configured to receive speech inputs 166 from the operator 10, or may be configured to receive inputs 166 via gesturing. The input device 168 and display 164 may correspond to a graphical user interface (GUI) configured to display one or more graphical elements (e.g., buttons) for the operator to touch to tap to issue the operator inputs 166. The operator inputs 166 may be received by the controller 150 through the network 70.

The controller 150 may receive one or more cutter parameter signals 144 related to operation of the cutter 20 and/or the articulated arm 140. For example, the controller may receive a cutter parameter signal 144 indicating whether or not the cutting flame igniter is On or Off. In other scenarios, the cutter parameter signal 144 indicates a position and/or orientation of the manipulator arm 140. Additionally or alternatively, the cutter parameter signal 144 may indicate whether the steel powder injector 26 is On or Off. The controller 150 may issue one or more cutter commands 142 based on the received base station operating parameters 302 and/or in response to an operator input 166. For example, in response to a user input 166, the controller 150 may issue a cutter command 142 to maneuver the manipulator arm 140 proximate to an object 50 to be cut. In other scenarios, the controller 150 may issue a cutter command 142 causing the powder injector 26 to inject the powder 42.

The drive system 120 may report encoder signals 158 from the encoder 128 to the controller 150. The controller 150 may determine the position of the vehicle 110 based on the received encoder signals 158. The controller 150 may issue one or more drive commands 156 to the drive system 120. The drive commands 156 may cause the drive motor 124 to rotate the one or more wheels 122a, 122b (e.g., tracks) to drive the vehicle in a direction indicated by the operator input 166. In some examples, the drive commands 156 can cause the ignition for the vehicle 110 to be turned On or Shutdown. During emergency conditions, the controller 150 may issue the drive command 156 to cause the ignition to shut down.

Figure 2:
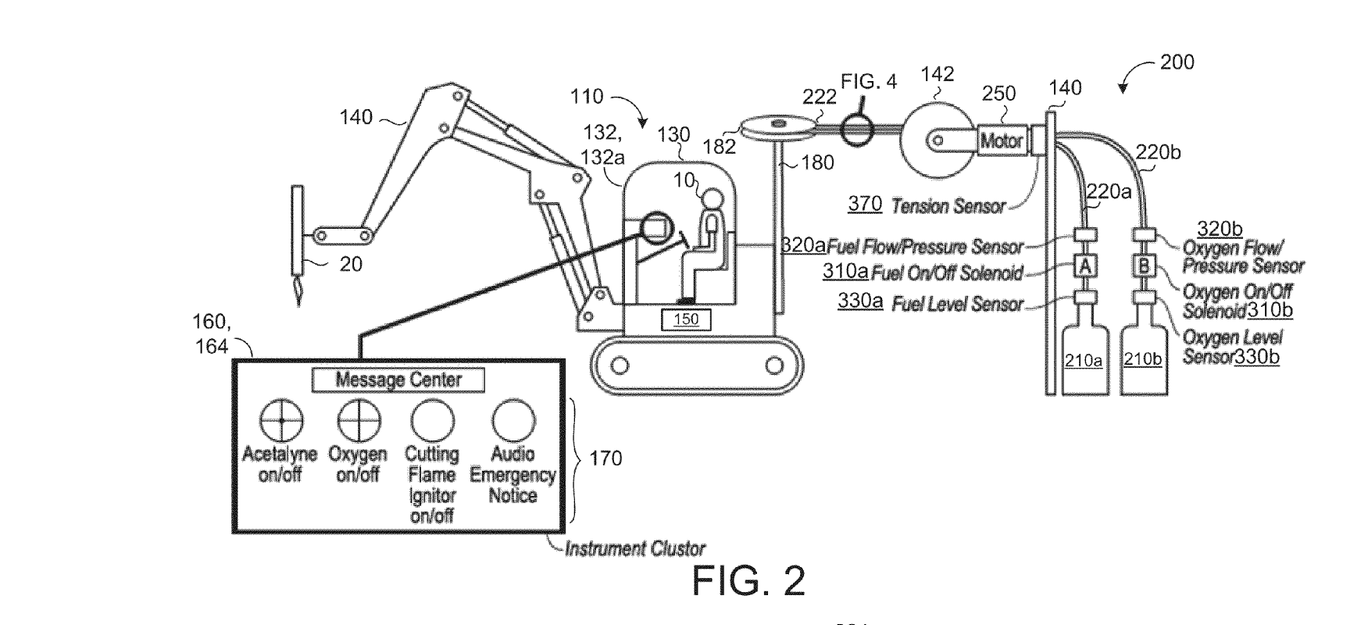
FIG. 2 is a schematic view of example sensors in communication with an operator interface of an example mobile cutting system.

FIG. 2 is a schematic view of the OI 160 displaying messages 170 corresponding to one or more operating parameters of the base station 200. The display 164 of the OI 160 may display the messages 170 in a configuration allowing the operator 10 to easily view the messages 170. The messages 170 may include text and graphics, and in some examples, audio messages may sound through a speaker within the cab 130. In the example shown, the display 164 displays a message center that presents whether a fuel source 210a (e.g., Acetylene) is On or Off, whether a reactant source 210b (e.g., Oxygen) is On or Off, whether a cutting flame igniter (e.g. cutter 20) is On or Off, and whether or not an Audio Emergency Notice is indicated. The message center on the display 164 may present any of the parameters 144, 158, 304 received by the controller 150, as shown in FIG. 1F. In the example shown, the controller 150 receives base station operating parameter signals 302 obtained by the tension sensor 370, the fuel (e.g., Acetylene) pressure sensor 320a, the fuel status sensor 310a, the fuel level sensor 330a, the reactant (e.g., Oxygen) pressure sensor 320b, the reactant status sensor 310b, the reactant level sensor 330b, and the tension sensor 370. The controller 150 may issue one or more graphic commands 162 to the OI 160 to display one or more of the various parameters obtained from the sensors 310-370 for the operator 10 to view upon the display 164. In some examples, the controller 150 issues a graphic command 162 when the presence of an emergency condition is present. For instance, when the fuel pressure and/or the reactant pressure is greater than an upper pressure limit, the controller 150 may indicate the presence of the emergency condition and thereby issue the graphic command 162 for the OI 160 to display the emergency condition to notify the operator 10. In other scenarios, when the tension sensed by the tension sensor 370 is greater than an upper tension limit, the controller 150 may indicate the presence of the emergency condition. In some implementations, the controller 150 may issue a graphic command 162 when the presence of a non-emergency condition is present. In these implementations, the graphic command 162 received by the OI 160 commands the OI 160 to display a warning message upon the display 164 to notify the operator 10 of a potential emergency.

Figure 4A:
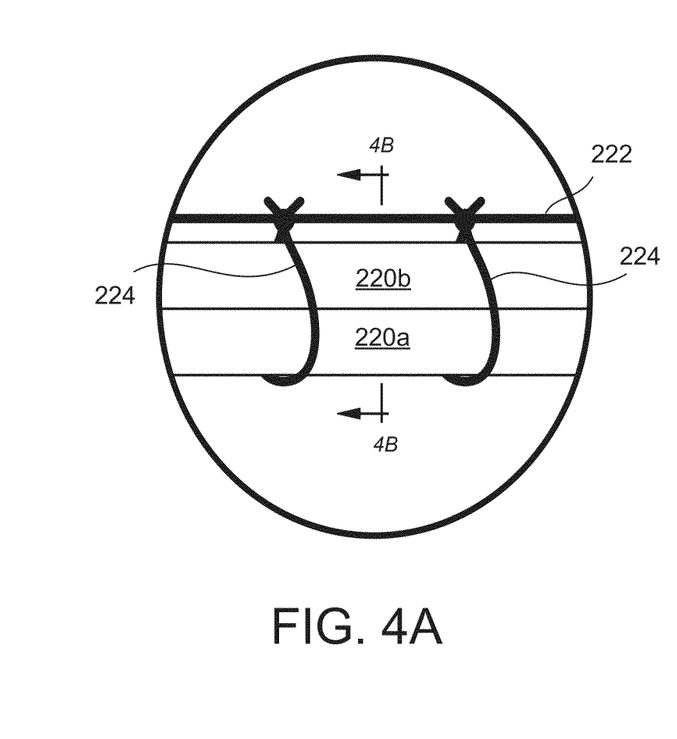
FIG. 4A is a schematic detailed view of an example guide cable of FIG. 3 configured to maintain a position of first and second feed lines.

In some implementations, a guide cable 222 guides the first and second feed lines 220a, 220b from the base station 200 to the cutter 20. The guide cable 222 is configured to maintain a position of the first and second feed lines 220a, 220b to prevent tangling as the feed lines 220a, 220b are pulled and released from the pole 140 at the base station 200. FIG. 4A, described in greater detail below, provides a detailed view of the guide cable 222.

Figure 3:
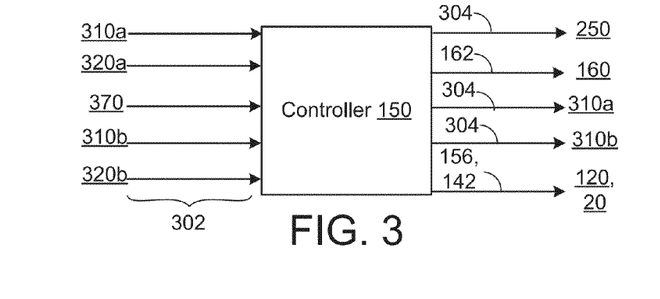
FIG. 3 is a schematic view of an example controller for the example mobile scrap cutting system of FIG. 2.

Referring to FIG. 3, the controller 150 may receive one or more base station operating parameter signals 302 from the base station 200 and issue one or more commands 162, 142, 156 and/or 304 based thereon. In the example shown, the parameter signals 302 are received from the fuel status and pressure signals 310a, 320a, the tension sensor 370, and the reactant status and pressure signals 310b, 320b. In some examples, the controller 150 may issue a base station command 304 to activate the tension motor 250 when tension of the one or more feed lines 220 is too low. In some scenarios, the controller 150 may issue cutting and drive commands 142, 156 to shut down operation of the vehicle 110, drive system 120, the cutter 20, and/or the manipulator arm 140 when the controller 150 indicates the presence of an emergency condition. For example, the controller 150 may issue the drive command 156 to cease power to the drive system 120 and shutdown the vehicle 110. In some implementations, the controller 150 may issue a graphics command 162 to the OI 160 to display a graphic or text upon the display 164 to notify the operator 10 of the presence of an emergency condition or a non-emergency condition. In some scenarios, the controller 150 may issue a base station command 304 to activate or deactivate the fuel solenoid 310a or the reactant solenoid 310b based on the received base station operating parameter signals 302.

Figure 4B:
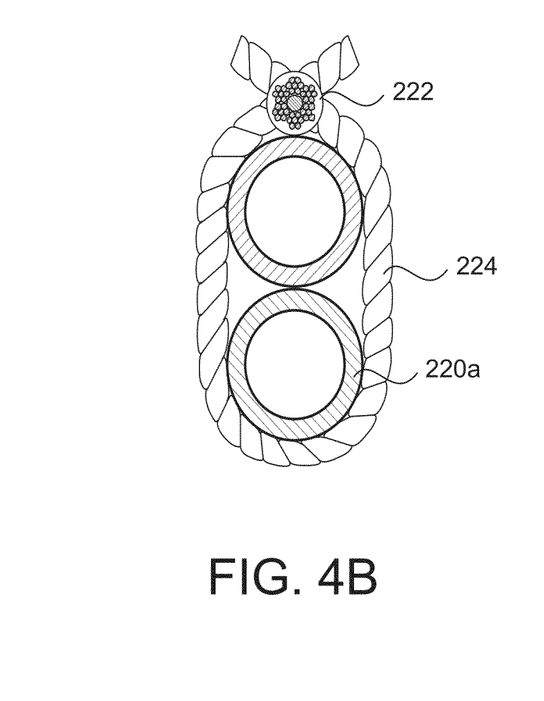
FIG. 4B is a schematic sectional view of the guide cable and first and second feed lines along line 4B-4B of FIG. 4A.

FIG. 4A is a schematic detailed view of the guide cable 222 of FIG. 3 configured to maintain a position of the first and second feed lines 220a, 220b between the base station 200 and the cutter 20. The guide cable 222 is oriented in parallel with the first and second feed lines 220a, 220b. Connection cables 224 are secured to and spaced about the guide cable 222 to suspend the first and second feed lines 220a, 220b from the guide cable 222 to maintain the position of the first and second feed lines 220a, 220b. In some examples, the spacing between each connection cable 224 is at least two inches. FIG. 4B provides a sectional view of the guide cable 222 and the first and second feed lines 220a, 220b along line 4B-4B of FIG. 4A.

Figure 5A:
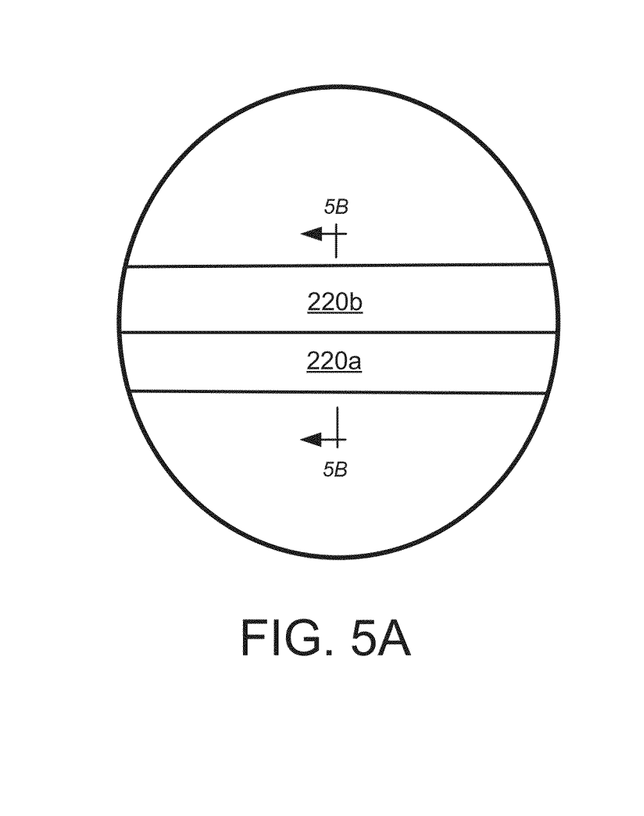
FIG. 5A is a schematic detailed view of an example protective mesh surrounding first and second feed lines.
Figure 5B:
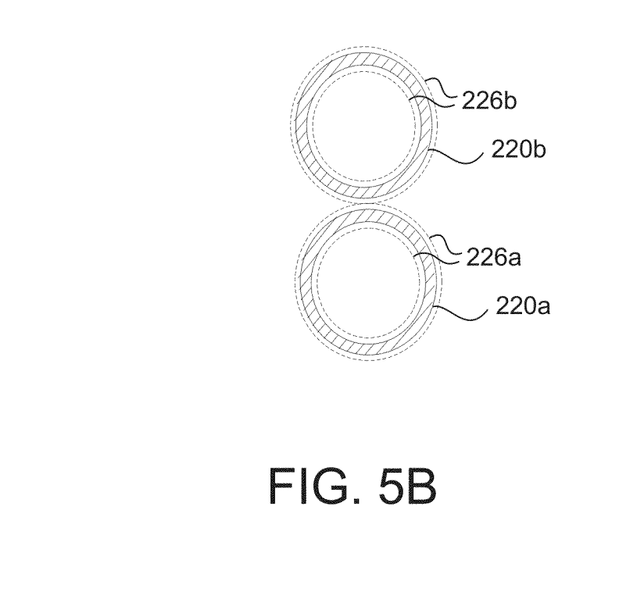
FIG. 5B is a schematic sectional view of the protective mesh and first and second feed lines along line 5B-5B of FIG. 5A.

In some implementations, referring to FIGS. 5A and 5B, a protective mesh 226a surrounds an exterior of the first feed line 220a and a protective mesh 226b surrounds an exterior of the second feed line 220b to protect the first and second feed lines 220a, 220b as they suspend between the base station 200 and the cutter 20. In other implementations, the protective mesh 226a, 226b reinforces interior walls of corresponding ones of the first and second feed lines 220a, 220b. The protective mesh 226a, 226b may be formed from steel or other material. In some examples, the pattern of the mesh permits some flexibility in the protective mesh 226a, 226b as the first and second feed lines 220a, 220b are pulled and released. Similar to the guide cable 222, the protective mesh 226a, 226b is configured to maintain a position of the first and second feed lines 220a, 220b to prevent tangling as the feed lines 220a, 220b are pulled and released from the pole 140 at the base station 200. FIG. 5B provides a sectional view of the protective mesh 226a, 226b and the first and second feed lines 220a, 220b along line 5B-5B of FIG. 5A.

Figure 6:
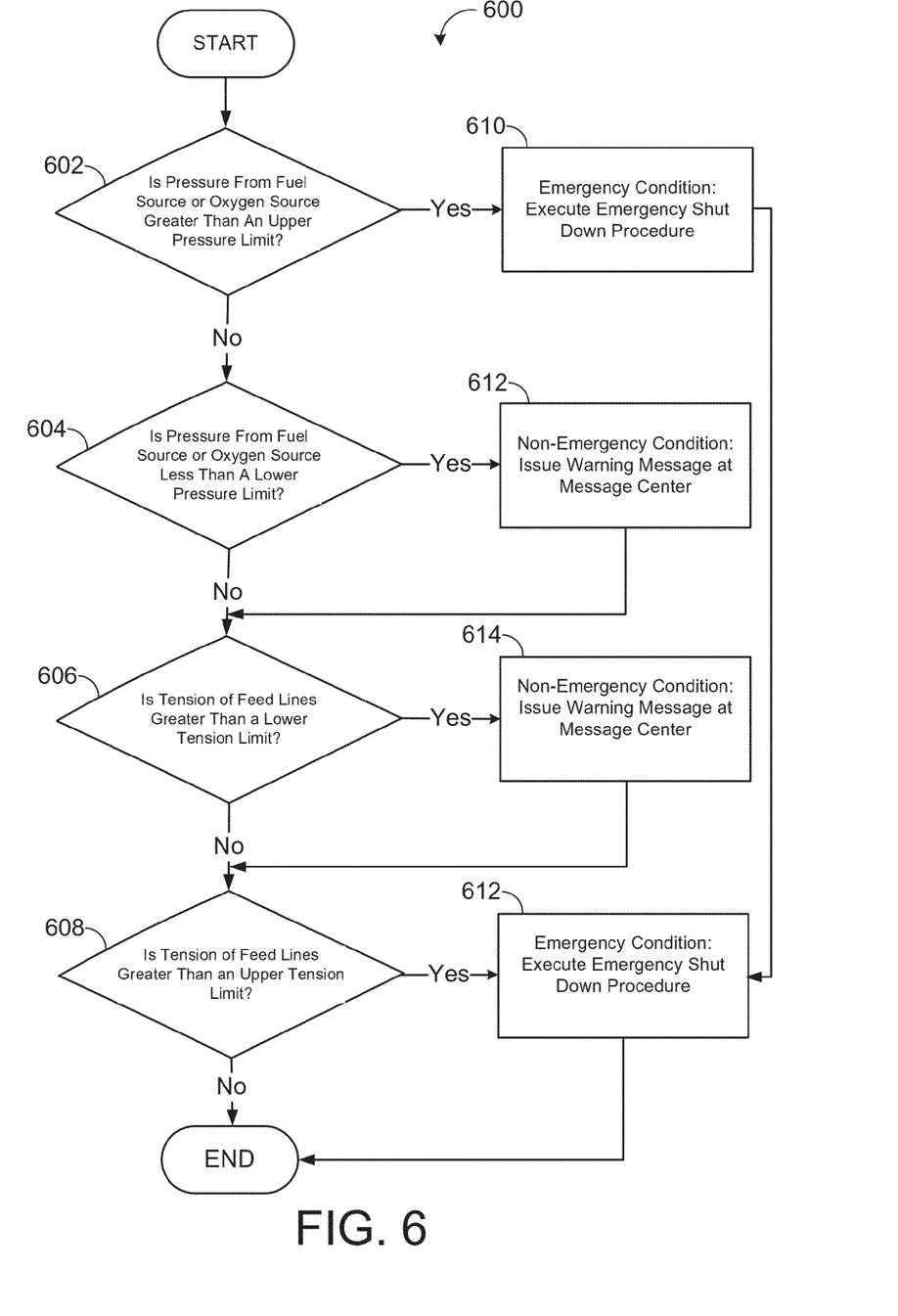
FIG. 6 is a flowchart of an example method for detecting emergency or non-emergency conditions in an example mobile cutting system.

FIG. 6 provides a flowchart of an example method 600 for detecting emergency or non-emergency conditions in the system 100. The example method 600 can be executed by the data processing device 152 based on computer-readable instructions within the non-transitory memory 154 of the controller 150. At decision block 602, the controller 150 determines if the pressure from the fuel source 210a or the Oxygen source 210b is greater than an upper pressure limit. If the pressure exceeds the predetermined limit (e.g., decision block 602 is "Yes"), the controller 150 detects the emergency condition is present at block 610 and executes an emergency shutdown procedure. The emergency shutdown procedure is described below with reference to FIG. 7.

If, however, the pressure does not exceed the upper pressure limit (e.g., decision block 602 is "No"), the controller 150 determines, at decision block 604, if the pressure from the fuel source 210a or the Oxygen source 210b is less than a lower pressure limit. If the pressure is less than the lower pressure limit (e.g., decision block 604 is "Yes"), the controller 150 detects the non-emergency condition is present at block 612 and issues a graphic command 162 corresponding to a warning message to be displayed by the OI 160 and proceeds to decision block 606. The warning message may notify the operator 10 that the pressure from the fuel source 210a or the Oxygen source 210b is less the lower pressure limit.

If, however, the pressure is at least the lower pressure limit (e.g., decision block 604 is "No"), the controller 150 determines, at decision block 606, if the tension of the one or more feed lines 220 obtained by the tension sensor 370 is greater than an upper tension limit. If the tension is greater than the lower tension limit (e.g., decision block 606 is "Yes"), the controller 150 detects the non-emergency condition is present at block 614 and issues a graphic command 162 corresponding to a warning message to be displayed by the OI 160 and proceeds to decision block 606. The warning message issued at block 614 may notify the operator 10 that the tension of the one or more feed lines is greater than the lower tension limit. After issuing the warning message at block 614, the controller 150 determines, at decision block 608, if the tension of the one or more feed lines 220 obtained by the tension sensor 370 is greater than an upper tension limit. If the controller 150 determines the tension of the one or more feed lines 220 is greater than the upper tension limit (e.g., decision block 608 is "Yes"), the controller 150 detects the emergency condition is present at block 610 and executes the emergency shutdown procedure.

Figure 7:
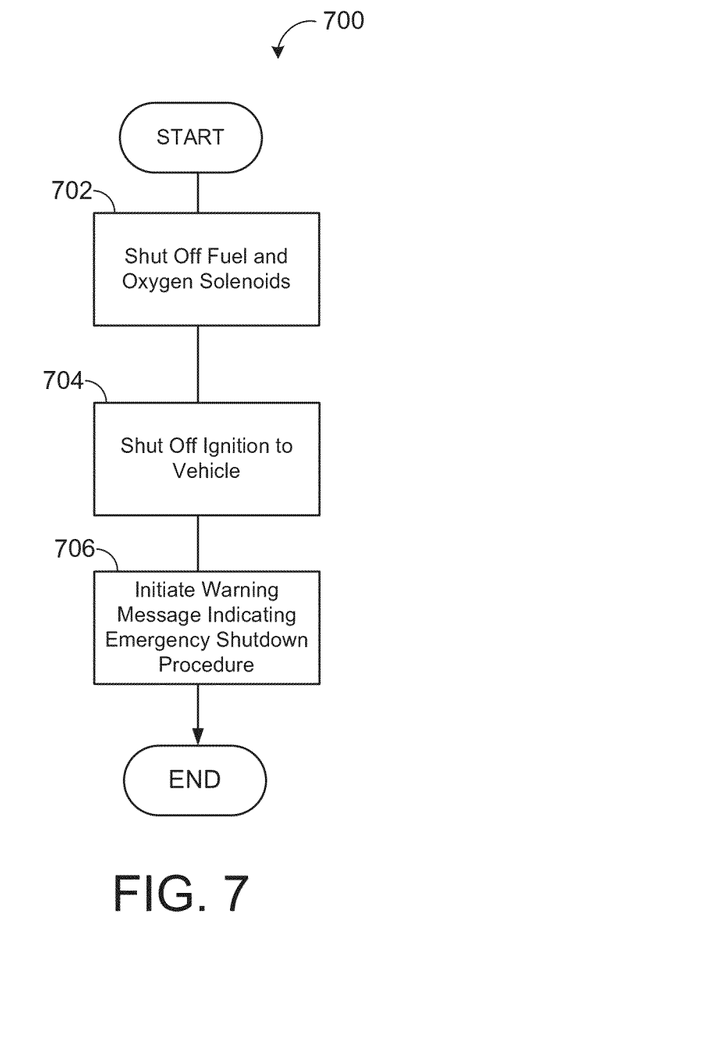
FIG. 7 is a flowchart of an example method for executing a shutdown procedure for an example mobile cutting system.

FIG. 7 provides a flowchart of an example method 700 for executing an emergency shutdown procedure when the controller detects the presence of an emergency condition in the system 100. The example method 700 can be executed by the data processing device 152 based on computer-readable instructions within the non-transitory memory 154 of the controller 150. At block 702, the controller 150 issues a base station command 304 to deactivate the fuel and oxygen solenoids (e.g., status sensors) 310a, 310b, respectively. When the solenoids 310a, 310b are deactivated, the corresponding fuel and oxygen from the corresponding fluid sources 210a, 210b is restricted from being transferred by the corresponding feed lines 220a, 220b to the cutter 20 at the vehicle 110. At block 704, the controller 150 issues a drive system command 156 to command the drive system 120 to turn off the ignition to the vehicle. Accordingly, all operation of the vehicle 110 will cease when the ignition is turned off and shutdown in response to the drive system command 156. However, when the ignition is turned off, the battery 126 may still power the OI 160 such that messages 170 can still be displayed for the operator's 10 viewing. At block 706, the controller issues a graphics command 162 corresponding to a warning message to be displayed by the OI 160. The warning message issued at block 706 may notify the operator 10 that an emergency condition is present and that the ignition has been turned off and the solenoids 310a, 310b are deactivated.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A mobile cutting system comprising:
    a vehicle comprising a vehicle body and a drive system, the drive system supporting the vehicle body and configured to maneuver the vehicle about a surface;
    a cutter attached to the vehicle body, the cutter configured to cut an object comprising scrap metal;
    a base station comprising:
        a post extending perpendicular from the surface;
        one or more fluid sources each storing a corresponding fluid used by the cutter to cut the object; and
        a reel attached proximate to a distal end of the post;
    one or more feed lines each providing fluid communication between the cutter and corresponding ones of the one or more fluid sources, each feed line received by the reel and suspended above the surface between the reel and the vehicle, the reel configured to enable the one or more feed lines to release as the vehicle maneuvers away from the base station or retract as the vehicle maneuvers toward the base station; and
    a controller in communication with the drive system, the cutter and the base station, the controller comprising a data processing device that executes a command to control one or more of the drive system, the cutter and the base station.

2. The system of claim 1, wherein the vehicle further comprises a manipulator arm having first and second portions, the first portion coupled to the vehicle body and the second portion coupled to the cutter.

3. The system of claim 2, wherein the cutter is releasably coupled to the second portion of the manipulator arm.

4. The system of claim 1, wherein the cutter comprises:
    a torch source; and
    a pilot light in communication with the controller and the torch source, the pilot light igniting the torch source in response to the command from the controller.

5. The system of claim 1, further comprising an operator interface in communication with the controller, the operator interface receiving an operator input from an operator of the vehicle.

6. The system of claim 5, wherein the controller receives the operator input and based on the received operator input, the controller executes the command.

7. The system of claim 1, wherein the base station further comprises a sensor system in communication with the controller, the sensor system providing a base station parameter signal to the controller obtained by one or more sensors disposed at the base station, the controller executing the command based on the received base station parameter signal.

8. The system of claim 7, wherein the sensor system includes at least one of a reactant pressure sensor, a reactant level sensor, a reactant status sensor, a fuel pressure sensor, a fuel level sensor, a fuel status sensor, a feed line tension sensor, or a vehicle position sensor.

9. The system of claim 7, further comprising an operator interface in communication with the controller and comprising a display, the operator interface receiving a graphics command from the controller based on the received base station parameter signal, the graphics command causing the operator interface to display a message upon the display corresponding to the base station parameter signal.

10. The system of claim 9, wherein the message indicates one of:
    an emergency condition when at least one of:
        a pressure obtained by the reactant pressure sensor or the fuel pressure sensor is greater than an upper pressure limit; or
        a tension of the one or more feed lines obtained by the feed line tension sensor is greater than an upper tension limit; or
    a non-emergency condition when at least one of:
        the pressure obtained by the reactant pressure sensor or the fuel pressure sensor is less than lower pressure limit; or
        the tension of the one or more feed lines obtained by the feed line tension sensor is greater than a lower tension limit.

11. The system of claim 7, wherein the controller issues a shutdown command to the drive system when the controller detects an emergency condition based on the received base station parameter signal, the shutdown command causing the drive system to turn off the vehicle ignition.

12. The system of claim 1, wherein the base station further comprises:
    a biasing member disposed on the reel, the biasing member biasing the reel in a retraction direction to retract the one or more feed lines.

13. The system of claim 1, wherein the base station further comprises:
    a retraction motor in communication with the controller, the retraction motor rotating the reel in a retraction direction to retract the feed line in response to the command from the controller.

14. The system of claim 1, wherein the one or more feed lines comprise:
    a first feed line transferring a fuel from the corresponding fluid source at the base station to the cutter; and
    a second feed line transferring a reactant from the corresponding fluid source at the base station to the cutter.

15. The system of claim 14, further comprising a guide cable guiding the first feed line and the second feed line from the base station to the cutter, the guide cable comprising connection cables configured to maintain a position of the first and second feed lines.

16. The system of claim 14, further comprising a protective mesh surrounding an exterior of each of the first and second feed lines or reinforcing an exterior of each of the first and second feed lines, the protective mesh configured to prevent tangling of the first and second feed lines.

17. The system of claim 1, wherein the vehicle further comprises:
- a container in communication with a controller, the container storing granulated steel powder; and
- a powder injector in communication with the controller and the container, powder injector injecting the steel powder from the container onto a cutting area of the object in response to the command from the controller.

18. A method comprising:
- receiving, at a controller of a system, base station parameter signals from a remote sensor system located at a base station of the system and in communication with the controller through a network, the received base station parameter signals indicating:
  - a fuel pressure within a first feed line that provides fluid communication of a fuel between a first fuel source located at the base station and a vehicle, the vehicle including a drive system configured to maneuver the vehicle about a surface relative to the base station; and
  - a reactant pressure within a second feed line that provides fluid communication of a reactant between a second fuel source located at the base station and the vehicle;
- determining, by the controller, whether or not an emergency condition is present in the system based on the received base parameter signals;
- executing, by the controller, an emergency shutdown procedure for the system when the emergency condition is present, the emergency shutdown procedure comprises issuing, by the controller, a first base station command to deactivate fuel and reactant solenoids of the sensor system, the issued base station command causing the fuel and reactant solenoids to block the fluid communication between the vehicle and corresponding ones of the first and second fuel sources.

19. The method of claim 18, wherein determining whether or not an emergency condition is present comprises:
- comparing the fuel pressure within the first feed line and the reactant pressure within the second feed line to an upper pressure limit, the fuel pressure and the reactant pressure obtained by corresponding sensors of the sensor system; and
- detecting the presence of the emergency condition when the fuel pressure or the reactant pressure is greater than the upper pressure limit.

20. The method of claim 19, further comprising:
- when the fuel pressure or the reactant pressure is not greater than the upper pressure limit, comparing, by the controller, the fuel pressure and the reactant pressure to a lower pressure limit;
- detecting, by the controller, the presence of a non-emergency condition in the system when the fuel pressure or the reactant pressure is less than the lower pressure limit; and
- issuing, by the controller, a graphics command to an operator interface of the system, the graphics command causing the operator interface to display a warning message corresponding to the presence of the non-emergency condition.

21. The method of claim 18, wherein:
- the received base station parameter signals further indicate a tension of the first and second feed lines, the feed tension obtained by a feed line tension sensor of the sensor system; and
- determining whether or not an emergency condition is present comprises:
  - comparing the tension of the first and second feed lines to an upper tension limit; and
  - detecting the presence of the emergency condition when the feed line tension is greater than the upper tension limit.

22. The method of claim 21, further comprising:
- prior to comparing the feed line tension to the upper tension limit, comparing, by the controller, the feed line tension to a lower tension limit;
- detecting, by the controller, the presence of a non-emergency condition in the system when the feed line tension is greater than the lower tension limit; and
- issuing, by the controller, a graphics command to an operator interface of the system, the graphics command causing the operator interface to display a warning message corresponding to the presence of the non-emergency condition.

23. The method of claim 18, wherein executing the emergency shutdown procedure for the system further comprises:
- issuing, by the controller, a drive system command to command the drive system to turn off ignition to the vehicle; and
- issuing, by the controller, a graphics command to an operator interface of the system, the graphics command causing the operator interface to display a warning message corresponding to the presence of the emergency condition.

24. The method of claim 18, further comprising:
- comparing, by the controller, a tension of the feed lines to slack limit, the feed line tension obtained by a feed line tension sensor of the sensor system; and
- when the feed line tension is less than the slack limit, issuing, by the controller, a second base station command to cause a retraction motor to rotate the reel in a retraction direction to retract the feed lines.

* * * * *